United States Patent [19]

Glenn et al.

[11] Patent Number: 4,624,009
[45] Date of Patent: Nov. 18, 1986

[54] SIGNAL PATTERN ENCODER AND CLASSIFIER

[75] Inventors: James W. Glenn, Reston; Joseph C. Brown, Herndon, both of Va.

[73] Assignee: Figgie International, Inc., Willoughby, Ohio

[21] Appl. No.: 146,155

[22] Filed: May 2, 1980

Related U.S. Application Data

[63] Continuation of Ser. No. 953,901, Oct. 23, 1978, abandoned.

[51] Int. Cl.⁴ ............................................. G10L 5/00
[52] U.S. Cl. ........................................................ 381/43
[58] Field of Search ............... 179/1 SD, 1 SE, 1 SM, 179/1 SA, 1 SC, 15.55 R, 15.55 T; 340/347 R, 146.3 WD, 347 DD; 358/288, 260, 261, 105; 325/38 B; 332/11 D; 364/728, 819, 513.5; 375/31

[56] References Cited

U.S. PATENT DOCUMENTS

| | | | |
|---|---|---|---|
| 3,213,268 | 10/1965 | Ellersick | 179/15.55 R X |
| 3,236,947 | 2/1966 | Clapper | 179/15.55 R X |
| 3,501,750 | 3/1970 | Anderson | 340/347 DD |
| 3,582,559 | 6/1971 | Hitchcock et al. | 179/15 B |
| 3,723,667 | 3/1973 | Park et al. | 179/1 SC |
| 3,755,627 | 8/1973 | Berkowitz et al. | 179/1 SA |
| 3,812,291 | 5/1974 | Brodes et al. | 179/1 SA |

OTHER PUBLICATIONS

G. White et al, "Speech Recognition Experiments etc.", IEEE Trans. on Acoustics, Speech, etc., Apr. 1976, pp. 183–188.

A. Robinson et al, "Results of a Prototype Television etc.", Proc. of IEEE, Mar., 1967, pp. 356–359.

Primary Examiner—E. S. Matt Kemeny
Attorney, Agent, or Firm—Knobbe, Martens, Olson & Bear

[57] ABSTRACT

An improved acoustic signal recognition system, suitable for speech or other acoustic pattern recognition, features data compression of original signal data to reduce requirements for data storage and comparison, as well as reduce recognition errors, the data is compressed by discarding signal spectral samples which do not vary from previously stored spectral samples by a threshold amount, using difference-gating.

13 Claims, 5 Drawing Figures

SIGNAL PATTERN ENCODER AND CLASSIFIER

This is a continuation of application Ser. No. 953,901, filed Oct. 23, 1978, now abandoned.

The present invention relates generally to a signal encoder and classifier and more specifically to such an encoder and classifier for signal data obtained from a multiplicity of property filters.

One particular function of the present invention is in its use relative to automatic speech interpretation. Such use will be used for illustrative and descriptive purposes.

Therefore, in order to place the descriptive matter in its proper perspective, the following discussion of currently available technology that may be applied to solve immediate problems in automatic speech interpretation is presented herewith.

BACKGROUND OF THE INVENTION

The present assignee has developed certain systems for speech interpretation on which several patents have issued.

An automatic speech interpreter, as disclosed in U.S. Pat. No. 3,812,291 issued May 21, 1974 and assigned to the assignee of the present invention, is essentially an acoustic pattern recognition device. Acoustically isolated utterances, such as words or phrases, are normalized by an information-theoretic compression technique that removes the effect of talker cadence and, to some degree, the effect of speaker variability. The resulting 120-bit pattern is then correlated with reference patterns derived through a training process. The only requirement for accurate recognition is reasonable acoustic separation between the patterns. The system can be retrained on-line for new vocabularies, speakers or acoustic environments at the rate of about 5 seconds per vocabulary utterance. A voice command system using this technique has been demonstrated with a large number of vocabularies of up to 100 words and in several languages. A unique feature is the ability to operate the system over commercial telephone circuits.

The present invention represents a significant improvement to the encoding and classification technology covered, in part, under U.S. Pat. No. 3,812,291 and U.S. Pat. No. 3,582,559 also assigned to the present assignee. Although this invention incorporates a number of logical processes common to those patents, it also incorporates critical differences that yield substantially improved signal classification accuracy while dramatically reducing the requirements for buffer storage of unencoded signal data. These improvements have been measured by operating the present invention as a word recognition device and comparing classification performance with that obtainable using a similar device incorporating the invention described in U.S. Pat. No. 3,812,291. Test material consisted of 1000 prerecorded utterances taken from a 100-word vocabulary designed to span the sounds of the American English language in a balanced fashion. Using these test data, the present invention yielded an average 40% reduction in classification errors when compared with the performance of the invention described in U.S. Pat. No. 3,812,291.

An acoustic signal recognition system divides an acoustic pattern into time samples, which are coupled to a spectrum analyzer for generating plural signals representing the amplitude of discrete frequency bands for each time sample.

A circuit is then used for computing the sum of the differences between each of the individual frequency bands of the current time sample and each of the respective frequency bands of the last stored time sample. This sum is compared with a stored threshold value, and the current time sample is stored if the sum exceeds the threshold, but discarded if the sum is less than the threshold.

The resulting stored time samples are compressed, to provide a normalized word length signal pattern, for comparison with a stored library of reference patterns.

Reference patterns are generated for this library by comparing the normalized word length patterns from plural, repetitive, acoustic signals, to provide a record of consistent elements of the normalized word length patterns. These consistent elements are used for identifying acoustic patterns. The ratio of the number of elements of a current normalized word length pattern identical to a given reference pattern divided by the total number of elements in the given reference pattern is used to determine whether or not the normalized word length pattern being compared is in fact the reference word; this ratio is called the normalized score ratio.

The beginning and end of acoustic patterns are identified by counting successive stored and discarded time samples, respectively. When a sufficient number of consecutive stored time samples occurs, a degree of change exists which indicates a word is being input. When a sufficient number of consecutive discarded time samples occurs, the lack of change over a period of time indicates the word has ended.

DETAILED DESCRIPTION OF A PREFERRED EMBODIMENT OF THE INVENTION

Figure 1:
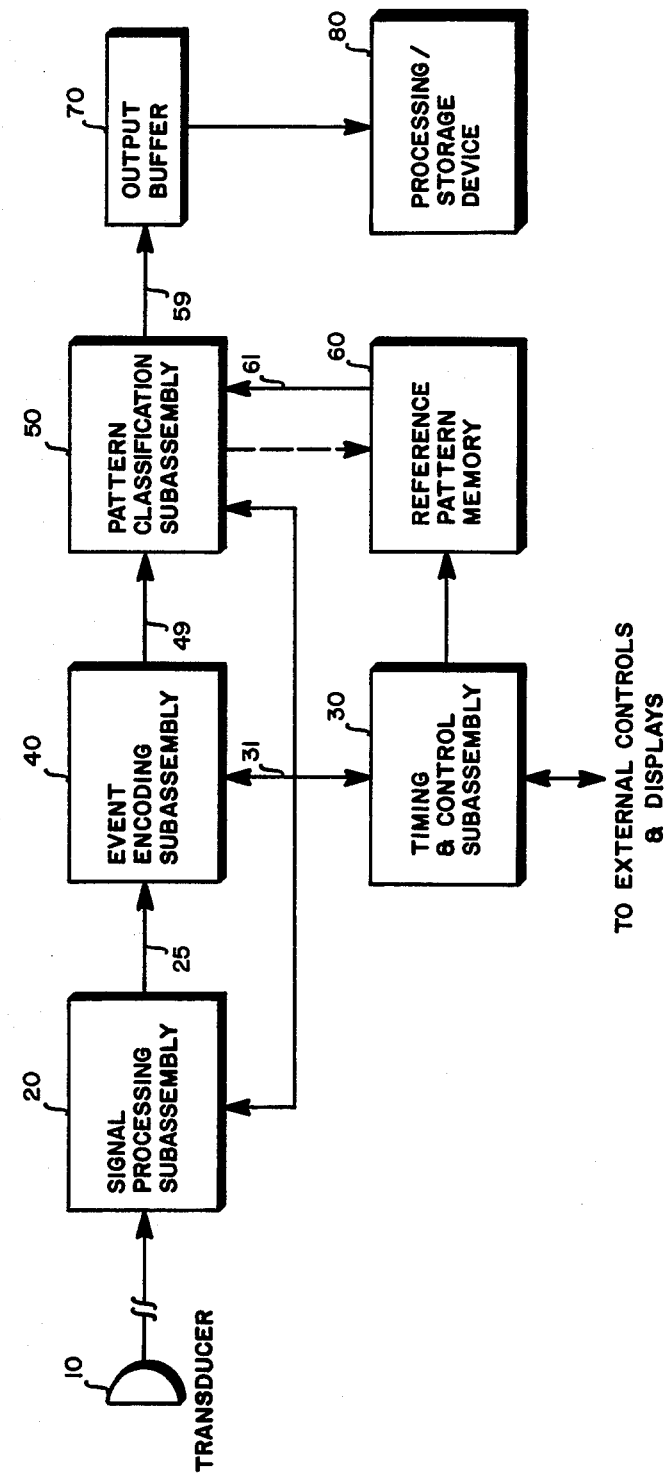
FIG. 1 is a general schematic diagram of the present invention.
Figure 2:
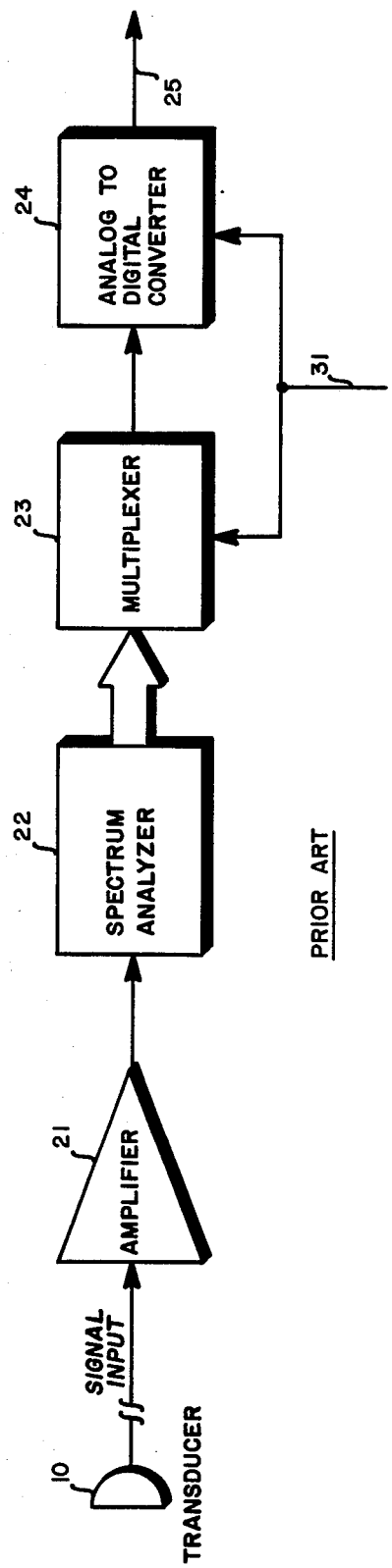
FIG. 2 is a schematic diagram of a prior art signal processor subassembly.

Referring to FIGS. 1 and 2, the signal processing subassembly 20 is shown in FIG. 2 and consists of amplifier 21, spectrum analyzer 22, multiplexer 23, and analog-to-digital converter 24 which are similar to the same components as disclosed in U.S. Pat. No. 3,812,291 and are all well known components. Transducer 10 may be any known component such as a microphone or telephone handset, and may be remotely located from the rest of the apparatus as indicated in FIGS. 1 and 2.

The present invention differs significantly in the event encoding subassembly 40 of FIG. 1 from the inventions covered by U.S. Pat. Nos. 3,582,559 and 3,812,291.

Figure 3:
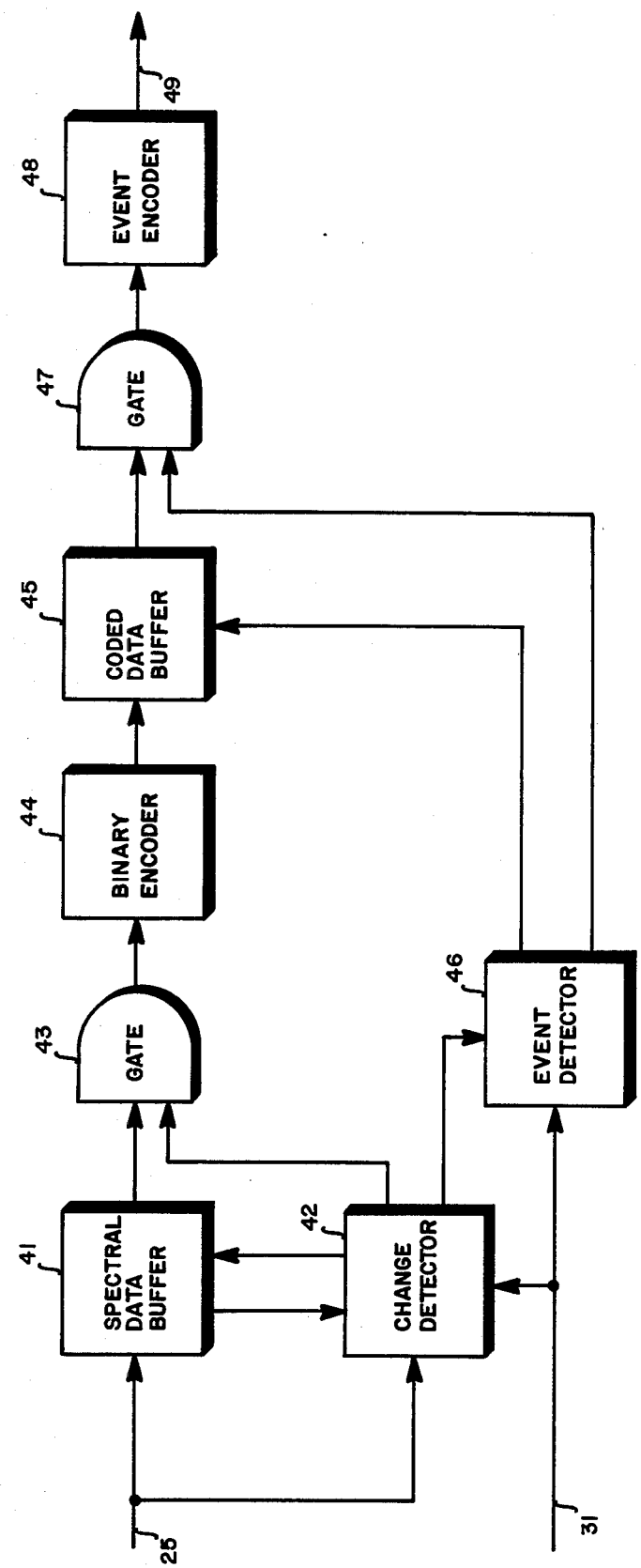
FIG. 3 is a schematic diagram of the event encoding subassembly.

Referring to FIG. 3, there is shown a diagram of the event encoding logic of the present invention. Instead of storing each digitized spectrum analyzer output for the duration of the utterance, the present invention retains only two spectrum samples in spectral data buffer 41. One sample is the current digitized output of the spectrum analyzer which will be denoted as:

$$F_C = \{f_1(t_c), f_2(t_c), \ldots, f_{16}(t_c)\} \quad (1)$$

where $f_j$ is the jth filter element, $j = 1, 2, \ldots, 16$ and $t_c$ is the current sample time.

The second sample is the last previous spectrum analyzer output accepted for encoding which will be denoted as:

$$F_L = \{f_1(t_L), f_2(t_L), \ldots, f_{16}(t_L)\} \quad (2)$$

where $f_j$ is the jth filter element, $j = 1, 2, \ldots, 16$ and $t_L$ is the sample time of the last previous spectrum accepted for encoding. This is one of the important concepts of the present invention. Either the first spectrum sample or a spectrum sample denoting a change is encoded. Accordingly, if a number of spectrum samples arrive which indicate no change, these samples are discarded. Therefore, any current sample is compared only to the last previously encoded sample. This greatly reduces the storage requirements of the coded data buffer 45. The absolute value of the difference between the two spectra in the spectral data buffer 41 is computed by the change detector 42. This is accomplished by summing the absolute values of the differences between the paired filter outputs of the two spectra according to the equation:

$$d_c = \sum_{j=1}^{16} |f_j(t_c) - f_j(t_L)| \quad (3)$$

where $f_j$ is the jth filter element, $j = 1, 2, \ldots, 16$;
$t_c$ is the current sample time;
$t_L$ is time of the last sample accepted for encoding.

The difference, $d_c$, is compared to change threshold $T_s$ to determine if the current sample is to be encoded. If $$d_c > T_s \quad (4)$$

then the current spectrum analyzer output is passed through gate 43 to the binary encoder 44 and entered in coded data buffer 45. At the same time, the current sample, $F_c$, replaces the "last previously encoded sample", $F_L$. If $$d_c \leq T_s \quad (5)$$

the current sample is purged from the spectral data buffer without being encoded, and the last previously encoded sample is not changed. In this fashion only spectrum samples that differ significantly from the last sample encoded are entered in the coded data buffer. Thus, if the spectrum is not changing significantly, i.e., there is no new information in the digitized spectrum, encoding does not take place.

A second significant difference from U.S. Pat. No. 3,812,291 is the fact that each spectrum analyzer output is substantially simultaneously encoded into a binary format as soon as it is selected by change detector 42. This results in a 16 to 1 savings in data storage when compared with the logic of the previous invention.

The binary encoder 44 operates on the same principal as the same device described in U.S. Pat. No. 3,812,291, FIG. 2, to produce a 15 bit code which will be denoted by $$C_i = \{b_1(i), b_2(i), \ldots, b_{15}(i)\} \quad (6)$$

where i is an index representing the ith data sample selected for encoding, and $b_j(i)$ is the jth binary digit (bit) of the ith encoded sample, per U.S. Pat. No. 3,812,291, FIG. 2, with $F_1$–$F_{16}$ representing the current output of signal processing subassembly 20 (FIG. 1 of the present invention) and Bit 1–Bit 15 as the input to coded data buffer 45 (FIG. 3 of the present invention).

Event detector 46 replaces the "word boundary detector" of U.S. Pat. Nos. 3,582,559 and 3,812,291. This is a third major difference from the previous inventions. Event detector 46 counts the total number samples S that have satisfied criteria (4) since the last previous event decision, and counts the number of consecutive samples $\bar{S}$ that have satisfied criterion (5) since the last previous event decision. Whenever $$\bar{S} = T_w \quad (7)$$

an event decision is made.

At that time, if $$T_{min} \leq S < T_{max} \quad (8)$$

the data contained in coded data buffer 45 are passed through gate 47 to event encoder 48 and S and $\bar{S}$ are reset to zero.

$$\text{If } T_{max} \leq S, \text{ or If } S < T_{min} \quad (9)$$

gate 47 is inhibited, coded data buffer 45 is reset to zero, and S and $\bar{S}$ are reset to zero. The values of $T_s$, $T_w$, $T_{min}$, and $T_{max}$ may be set to match appropriate signal conditions. For use in word recognition, for instance, typical values are:

$$T_s = 16, T_w = 32, T_{min} = 16, T_{max} = 200 \quad (10)$$

with the system sampling rate set at 200 samples per second. In this case, $T_w$ specifies a gap of silence between words of at least 160 ms as a key to declaration at the end of an utterance, (criterion 7). Utterances must contain a minimum of 16 coded data samples and a maximum of 199 such samples to be declared "valid" words, (criterion 5). Furthermore, each coded data sample must have satisfied criteria (4). These event criteria provide a very effective filter for the elimination of extraneous acoustic events unrelated to discrete word utterances.

Event encoder 48 receives data under the control of event detector 46. When criteria (7) and (8) are satisfied, the binary encoded data from buffer 45 are further compressed to form a 120 bit representation of the event (word) that just occurred. This is an important step because a variable amount of data (from 16 to 199 coded data samples) may be stored in buffer 45. After processing by event encoder 48, these data will be in a fixed 120 bit format suitable for use by pattern classifier subassembly 50. Event encoder 48 segments the data in buffer 45 into eight equal intervals by dividing the total number of data samples D, by eight, discarding any remainder. Within each interval, the binary encoded data, consisting of a multiplicity of 15-bit samples of form (6), are combined to form a single 15-bit representation as follows:

Assume the binary data samples associated with one of the eight intervals are arranged as follows:

$$b_1(1), \quad b_2(1), \quad \ldots, b_{15}(1)$$
$$b_1(2), \quad b_2(2), \quad \ldots, b_{15}(2)$$
$$\vdots \quad \vdots \quad \quad \vdots$$
$$b_1(D/8), b_2(D/8), \ldots, b_{15}(D/8) \quad (11)$$

where each row represents a binary encoded sample of form (6). Array (11) is to be replaced by a single 15-bit array of the form:

$$B_1, B_2, \ldots, B_{15} \quad (12)$$

where $B_j$ replaces column j of (11) according to the following rule:

$B_j = 1$ if the number of "one" bit in column $j$ (13)
of (11) is greater than $D/16$
$B_j = 0$ otherwise Since eight arrays of the form (12) are created for each event encoded, a 120-bit binary pattern is output by event encoder 48 for each detected event.

The 120-bit pattern output by event encoder 48 is sent to pattern classifier subassembly 50.

The reference pattern memory 60 must be loaded with encoded patterns representative of the events to be classified. The present invention can be programmed, via the estimation mode of operation of pattern classification subassembly 50, to produce reference patterns matched to events input to the signal processing subassembly. The programming operation, commonly referred to as "training", will be described in terms of use of the invention as a word recognition device, although this should not be interpreted as limiting use of the invention to such an application.

Figure 4A:
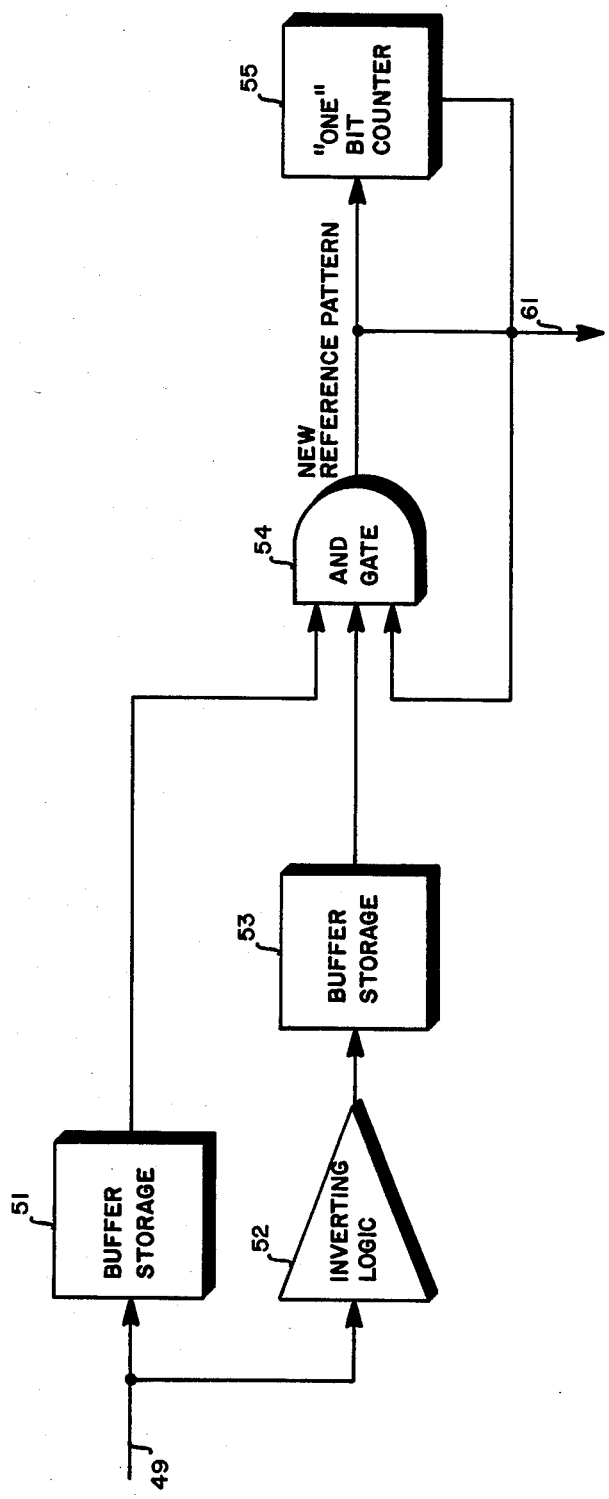
FIG. 4a is a schematic diagram of the estimation mode of the pattern classifier subassembly.

For the purpose of programming reference pattern memory 60, the pattern classification subassembly 50 operates as follows under supervision of the timing and control subassembly 30: (Refer to FIG. 4a.)

(1) The user is prompted via visual or audio means (not shown) to speak each word to be included in the reference pattern memory (vocabulary).

(2) As each prompted word is spoken, it is encoded into a 120-bit binary pattern by event encoding subassembly 40 as described above and transferred to buffer storage 51.

(3) The 120-bit pattern is then inverted by inverting logic 52 to create a second 120-bit pattern which is the two's complement of the original. The complemented pattern is stored in buffer storage 53.

(4) The resulting 240-bit pattern contained in buffers 51 and 53 is then ANDED by gate 54 with the appropriate contents of the reference pattern memory as selected by the timing and control subassembly. (If no previous examples of the particular vocabulary item have been entered into memory, the 240-bit pattern is ANDED with 240 "one" bits.) As a result of the ANDING operation, the first 120 bits of each reference pattern will be "one" bits if and only if each bit was consistently a "one" bit for all training examples. Bits 121 through 240 will be "one" bits if any and only if each bit was consistently a "zero" bit for all training examples. This is a result of the inverting operation. The reference pattern for event class K will be denoted by $$R_k = p_1(k), p_2(k), \ldots, p_{240}(k) \quad (14)$$

where $p_1(k), p_2(k), \ldots p_{120}(k)$ represent the binary digits resulting from ANDING all encoded training examples for class K and $p_{121}(k), p_{122}(k), \ldots, p_{240}(k)$ represent binary digits resulting from ANDING all complemented encoded training examples for class K.

(5) Finally, the total number of "one" bits in $R_k$ are counted by bit counter 55. This count, which represents the total number of bits, either "one" or "zero", that were consistent in all training examples, is stored along with $R_k$ in reference pattern memory 60, which may be one of many well known devices for storing binary data. The number of consistent bits for event class K will be denoted by $N_k$.

From the above discussion it can be seen that the training operation of this invention is "open ended", i.e., it can be continued indefinitely in time. In particular, the reference pattern memory could be "updated" every time a word was spoken and identified, thus allowing the invention to adapt itself to changes in signal conditions, e.g. fatigue in a speaker's voice. This method of pattern estimation differs substantially from that described in U.S. Pat. No. 3,812,291 which required that pattern estimation be limited to a fixed number of class examples presented to the estimator prior to operation of the pattern classifier. This aspect of the present invention then represents a fourth significant difference from the invention described in U.S. Pat. No. 3,812,291. Optional operation of updating pattern classification subassembly 50 in the estimation mode is indicated by the dashed line in FIG. 1.

Figure 4B:
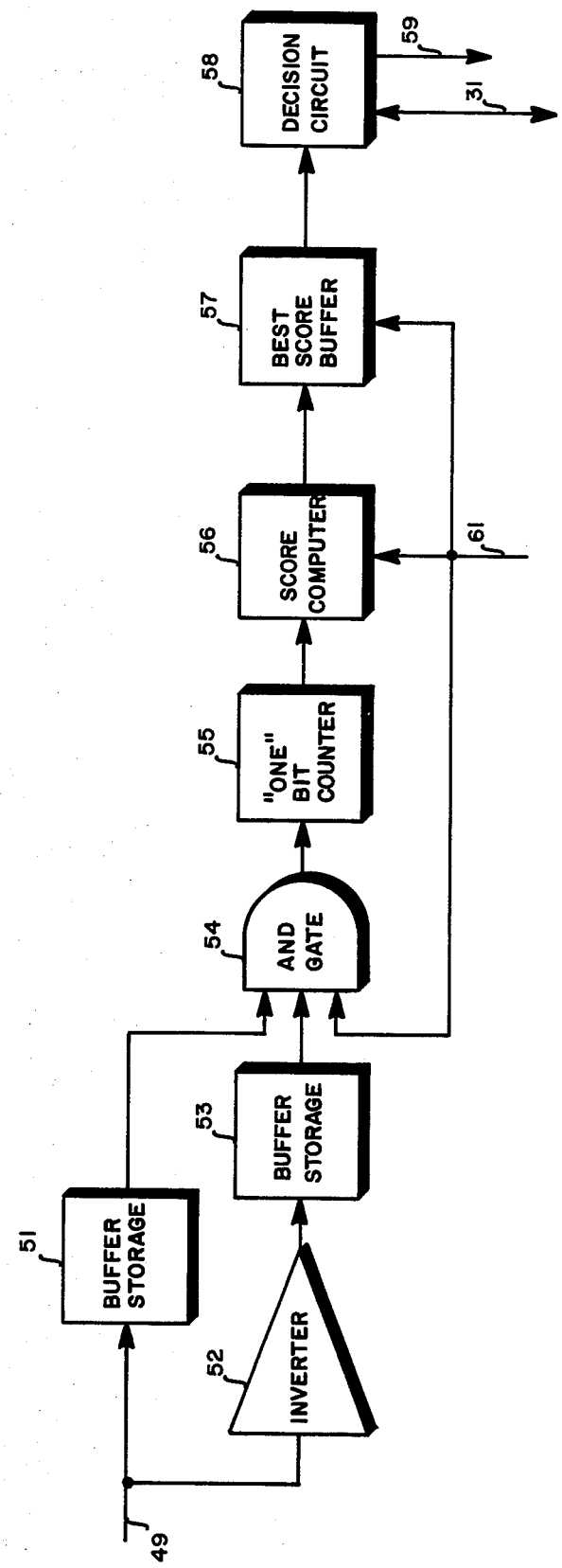
FIG. 4b is a schematic diagram of the classification mode of the pattern classifier subassembly.

The classification mode of pattern classifier 50 is diagrammed in FIG. 4b. The 120-bit binary pattern generated by event encoding subassembly 40 is ANDED in both its original and two's complement form with class candidate reference patterns selected from reference pattern memory 60. Bits 1–120 of the event encoder output are ANDED with bits 1–120 of each selected reference pattern. The resulting count of "one" bits generated by counter 55 represents the number of bit matches between the event encoder output and reference pattern "one" bits that were consistent for all training examples. Bits 121–240, generated by inverting the event encoder output, are ANDED with bits 121–240 of each selected reference pattern. The resulting count of "one" bits generated by counter 55 represents the number of bit matches between the event encoder output and reference pattern "zero" bits that were consistent for all training examples. Thus the total 240 bit count generated by "one" bit counter 55 represents the total number of bit matches between the "ones" and "zeros" of the event encoder output and the consistent "ones" and "zeros" contributing to the reference pattern. This count will be denoted by $C_k$ where K is the class index. For each class, the maximum output from counter 55 is $N_k$, which represents a perfect match with the consistent bits of the reference pattern. Score computer 56 calculates the value $$S_k = M(C_k/N_k) \quad (15)$$

where $S_k$ is the pattern classification score computed between the event encoder output and reference pattern class K, and M is a constant equal to the maximum score possible.

By definition $C_k/N_k \leq 1$. This ratio "normalizes" the scores obtained to account for the consistency of the training patterns.

The highest value of $S_k$ for the selection of reference patterns matched with the event encoder output is stored in best score buffer 27 along with the class index, K.

The selection by the operator or machine of pattern classes (vocabulary items in word recognition) presented for matching with the output of the event encoder is controlled by timing and control assembly 30. The selection presented may be altered on the basis of previous classification decisions. When all selected classes have been matched, the best score stored in buffer 57 is compared to a reject threshold, RTHL, by decision circuit 58. If $$\hat{S}_k > RTHL \quad (16)$$

where $\hat{S}_k$ is the highest score resulting from the selected classification sequence, the decision is made in favor of class K and index K is sent to output buffer 70. The information stored in buffer 70 may then be used by a suitable process or storage device 80 such as data processing or data storage devices.

$$S_k \leq RTHL$$

no decision is made and no code is output to buffer 70.

Classification decisions are monitored by timing and control subassembly 30 to permit selection of reference patterns for additional classification decisions. The timing and control subassembly 30 provides clocking signals to activate multiplexer 23 and analog-to-digital converter 24 of FIG. 2, as well as change detector 42 and event detector 46 of FIG. 3. The timing and control subassembly also provides class identification during the estimation mode of operation of pattern classification subassembly 50, and provides a sequence of candidate class indices during the classification mode of operation. For some applications of the invention, timing and control subassembly 30 may be interfaced to external controls and displays including switches, push buttons, keyboards and visual display devices of known art as indicated in FIG. 1. Timing and control subassembly 30 is of known art and may generally be considered to be any of a number of commercially available stored program controllers.

It is to be understood that the above description and drawings are illustrative only since equivalent components may be used in the practice of the invention. Accordingly, the invention is to be limited only by the scope of the following claims.

We claim:

1. An acoustic signal encoder and classifier, comprising:
   a transducer;
   signal processing means coupled to the output of said transducer for providing spectrum samples representative of the signal output of said transducer, each of said spectrum samples having multiple elements;
   event encoding logic means for computing the sum of the differences between each element in a current spectrum sample and each corresponding element in the last previous spectrum sample accepted by said event encoding logic means and for discarding said current spectrum sample if said sum is below a predetermined threshold value;
   means for classifying patterns, said pattern classification means being coupled to the output of said event encoding logic means;
   means for timing and controlling, said timing and control means being coupled to said signal processing means, said event encoding logic means and said pattern classification means; and
   means for storing a reference pattern said storage means being coupled between said timing and control means and said pattern classification means.

2. The encoder and classifier of claim 1, wherein said event encoding logic means comprises:
   spectral data buffer means;
   change detector means coupled between the output of said signal processing means and said spectral data buffer means for detecting changes in said spectrum samples;
   binary encoding means for encoding a spectrum sample supplied as an input to said binary encoding means;
   storage means for storing said encoded spectrum sample; and
   gating means coupled between said binary encoding means and said spectral data buffer means, said gating means being responsive to said change detector means to cause said spectrum sample to be supplied from said spectral data buffer to said binary encoding means only if said change detector means determines that said sum is above said predetermined threshold value.

3. The encoder and classifier of claim 2, wherein said event encoding logic means further comprises:
   event detector means responsive to said timing and control means and said change detector means for counting the number of changed and unchanged samples subsequent to the last previous encoded sample.

4. Apparatus for recognizing multi-frequency acoustic signal patterns, comprising:
   means for monitoring said acoustic patterns and for dividing said patterns into multiple time samples;
   means for comparing a current time samples with the most recent time sample stored by said apparatus to provide a difference measurement indicating a change in said acoustic patterns with time;
   means responsive to said comparing means for selecting certain ones of said time samples when said difference measurement exceeds a predetermined threshold value, and for discarding the remaining time samples;
   means for storing said certain ones of said time samples; and
   means for comparing said certain ones of said time samples in said storing means with a reference pattern.

5. Apparatus for selectively sampling and storing a multi-frequency acoustic signal pattern, comprising:
   a signal processor responsive to said multi-frequency acoustic signal pattern for periodically producing multiple outputs, each output representing a discrete frequency band;
   means for comparing the multiple outputs representing said multi-frequency acoustic signal at a current time with the corresponding multiple outputs representing said multi-frequency acoustic signal at the most recent time said multi-frequency acoustic signal pattern was stored, for determining which of said periodically produced multiple outputs will be selected based on said comparison, and for encoding said selected multiple outputs while discarding the remaining ones of said multiple outputs prior to the generation of all of said multiple outputs; and means for storing the output of said comparing and encoding means.

6. An acoustic signal gate, comprising:

means for dividing an acoustic signal into time segment samples;

means for comparing the difference between successive ones of said time segment samples to provide difference signals;

means for comparing said difference signals with a constant to provide signals indicating differences above or below said constant;

means for counting successive ones of said signals indicating differences below said constant to provide a signal $\overline{S}$;

means for counting said signals indicating differences above said constant to provide a signal S; and means comparing both said $\overline{S}$ signal and said S signal with constants to gate said audio signal patterns.

7. Apparatus for identifying an acoustic signal pattern, comprising:

means for generating plural binary bit training patterns, each of said plural binary bit training patterns representative of said acoustic signal pattern, said plural binary bit training patterns being generated in response to first plural ones of said acoustic signal patterns to train said apparatus;

means for detecting which of the corresponding bits of each of said plural binary bit training patterns are identical for all of said plural binary bit training patterns; and means identifying second acoustic signal patterns by comparing said identical bits with comparable bits produced from said second acoustic signal patterns.

8. Apparatus as defined in claim 7, wherein said detecting means additionally detects which of said identical bits of said plural binary bit training patterns are also identical with said comparable bits produced from said second acoustic signal patterns, to provide a new set of identical bits for use by said identifying means to continuously retrain said apparatus.

9. Apparatus as defined in claim 8 wherein said identifying means additionally divides the number of said comparable bits which are identical to said identical bits of said first patterns by the number of said identical bits of said first patterns to provide a normalized score ratio.

10. Apparatus as defined in claim 9 wherein said identifying means additionally compares said normalized score ratio with a constant to provide an indication of an identified acoustic signal pattern.

11. A method for identifying multi-frequency acoustic signal patterns, comprising: 'monitoring said acoustic patterns;

dividing said monitored patterns into time samples;

comparing said time samples with one another to provide a difference measurement indicating a change in said acoustic patterns with time;

selecting certain ones of said time samples in accordance with said difference measurement;

storing said certain ones of said time samples; and comparing said stored time samples to stored reference patterns to identify said signal patterns.

12. A method for gating acoustic signals, comprising:

dividing said acoustic signal into time segment samples;

comparing the difference between successive ones of said time segment samples to provide difference signals;

comparing said difference signals with a constant to provide signals indicating differences above or below said constant;

counting successive ones of said signals indicating differences below said constant to provide a signal $\overline{S}$;

counting said signals indicating differences above said constant to provide a signal S; and comprising both said $\overline{S}$ signal and said S signal with constants to gate said audio signal pattern.

13. A method for identifying an acoustiic signal, comprising:

generating plural binary bit training patterns, each of said plural binary bit training patterns representative of said acoustic signal, said plural binary bit training patterns being generated in response to first plural ones of said acoustic signal to train said apparatus;

detecting which of the corresponding bits of each of said plural binary bit training patterns are identical for all of said plural binary bit training patterns; and identifying a second acoustic signal by comparing said identical bits with comparable bits produced from said second acoustic signal.

* * * * *